March 27, 1962  P. C. HUNGERFORD, JR., ETAL  3,026,739
PLURAL SPEED DRIVING MECHANISMS
Filed Nov. 28, 1958
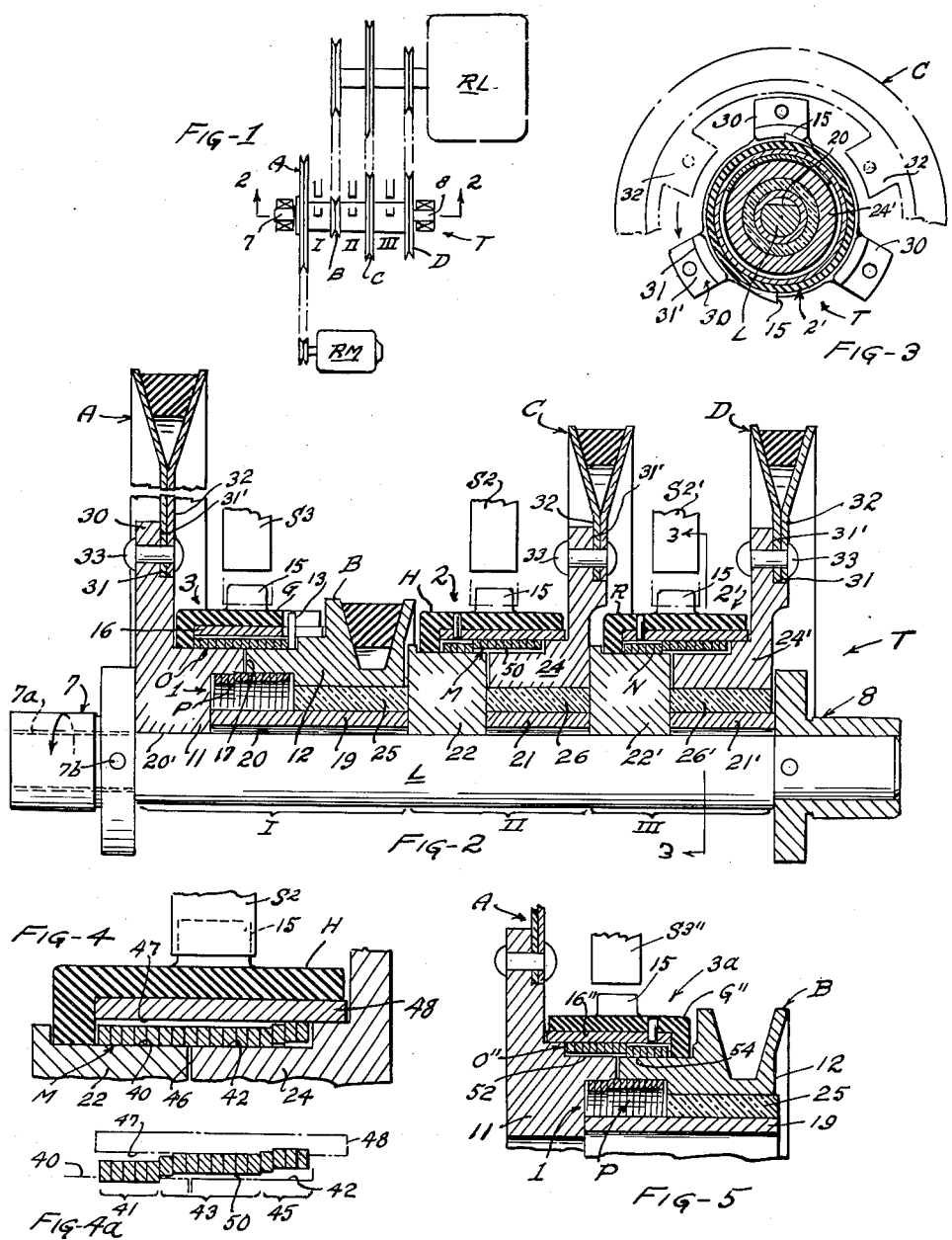
INVENTORS
P. C. HUNGERFORD JR
D. R. TOMKO
RUSSELL F. NEFF
By George M. Soule
ATTORNEY 3,026,739
Patented Mar. 27, 1962

3,026,739
PLURAL SPEED DRIVING MECHANISMS
Philip C. Hungerford, Jr., Cleveland Heights, Donald R. Tomko, Cleveland, and Russell F. Neff, East Cleveland, Ohio, assignors to Curtiss-Wright Corporation, a corporation of Delaware
Filed Nov. 28, 1958, Ser. No. 777,139
18 Claims. (Cl. 74—368)

This invention relates to above titled mechanisms adapted for use in automatic or semi-automatic machines wherein rotary loads require operation, e.g. cyclically, at two or more widely varying speeds, wherein speed changes can be accomplished by simple means operable safely in various ways of versatility and convenience of control, and with a relatively small amount of shock to the rotating components, the components can have low inertia in relation to torque involved, and are relatively inexpensive to manufacture, assemble and service.

An important feature of the present invention is that all the necessary components for obtaining a plurality of forward speeds and reverse, if desired, are in a single self-contained, axially compact unit in which all the relatively rotatable torque transmitting parts of the unit are coaxial.

The present invention employs power stop control spring clutches for rendering an energizable and deenergizable power source such as an electric motor operative to drive a single load selectively at different speeds at different times through constantly coupled ratio change driving means such as belts, chains or gears. In many such mechanisms, unless provision of drive couplings designed to slip on overload are used in series with the spring clutches, transition from one speed to another is accompanied by severe destructive shock since spring clutches per se as usually made are inherently unstable and allow almost insignificant time for the load to be accelerated from one speed condition to another. The present mechanism among other features has load limiting provision in the spring clutches themselves for materially extending acceleration time when necessary without experiencing destructive shock. Also, for emergency stopping or rapid deceleration, most prior plural speed drive arrangeemnts using spring clutches as outlined above required brakes. In the present arrangement rapid deceleration and emergency stopping can be safely accomplished by simple, e.g. electrical, control of spring clutches designed to transmit limited torque and without having to provide any other braking means.

Objects hereof and novel features not indicated by the above discussion will become apparent from the following description of the preferred arrangements shown herewith.

In the drawing, FIG. 1 is a schematic view wherein the transmission T hereof (cf. FIG. 2) is coupled to a prime mover such as an electric motor RM via wheel A and has its output wheels B, C and D continuously coupled to a rotary load RL through belts or the like affording three different ratios from the transmission to the load.

FIG. 2 is a relatively enlarged longitudinal cross sectional fragmentary view taken as at 2—2 on FIG. 1 showing the construction and interrelationship of three clutch assembly units I, II and III adapted respectively for low, intermediate and high speed driving of a rotary load.

FIG. 3 is a reduced scale transverse sectional view taken as at 3—3 on FIG. 2 showing the preferred manner of mounting the wheels A, B, C and D, shown as pulleys, on input or output members of the clutch units I, II and III, one of the wheels (C) being shown in broken lines in unattached position.

FIG. 4 is a double scale fragmentary view similar to FIG. 2 showing the essential parts of one of the spring clutches (2 as shown in FIG. 2) in engaged condition.

FIG. 4a is a fragmentary partly diagrammatic view showing the clutch spring of FIG. 4 and particularly the relationship of groups of coils thereof when the spring is in a relaxed state.

FIG. 5 is a fragmentary sectional view taken similarly to FIG. 2, showing a modified construction of the low speed driving clutch assembly unit I' wherein spring clutch 3a is particularly adapted for slow-down or braking purposes.

GENERAL ARRANGEMENT—TERMINOLOGY

Low speed unit I involving wheels A and B, FIGS. 1 and 2, includes two spring clutch assemblies or units (hereinafter usually "spring clutches") 1 and 3.

Intermediate speed unit II has one spring clutch, 2.

High speed unit III has one spring clutch identified as 2' since its preferred construction is the same as clutch 2.

"First spring clutch" (as in claims hereof) is intended to identify spring clutch 1; "second spring clutch" refers to intermediate speed drive clutch 2 but would be applicable if considered as referring to high speed drive clutch 2'; and "third spring clutch" refers to clutch 3 or 3a.

A "normally disengaged" type spring clutch (herein represented by clutches 2, 2', FIG. 2 and 3a, FIG. 5) refers to one in which the clutch spring is normally in non-driving condition, requiring positive (opposite of negative) actuation into driving or engaged condition.

A "Normally engaged" type spring clutch (only example herein being clutch 3) is one that is self energizing in order to transmit driving torque, wherefore it requires "actuation" in a negative sense into disengaged condition.

"Overrunning spring clutch" could of course refer to any spring clutch whose coils overrun at times, but herein the term refers (as in respect to clutch 1) to a spring clutch which is self energizing and overruns automatically, or in other words, requires no actuator means for its operation.

The term "full floating" in reference to a clutch spring indicates that the spring is elastically preloaded on a pair of mutually adjacent clutch drums and can overrun on either as in the case of spring O of normally engaged clutch 3 of FIG. 1.

Incidentally, the terms "input drum member" and "output drum member" as used in the claims hereof are principally for identification of parts as shown. Drum members 11 and 12, FIG. 2, normally serve respectively as input and output drums of spring clutches 1 and 3. However, during slow down and braking operations, to be described, their specific functions are reversed. Drum member 12 then becomes an input drum in reference to clutch spring O of clutch 1. Drum members 22 and 22' always serve as input clutch members.

*System and Construction per FIG. 1 Through FIG. 4a*

Assuming FIG. 1 represents installation of the transmission unit T between a reversible electric motor RM and the tumbler or basket RL of an automatic laundry machine, then clutch unit or assembly I may serve two purposes; namely, to drive the rotary load (tumbler or basket RL) at low speed (e.g. 50 to 60 r.p.m.) during a relatively protracted washing portion of the cycle, and to drive the load at the same speed in reverse for part of that same cycle portion or for tumble drying. Spring clutch 1 hereof is of the overrunning or "free wheeling" type so that load driving operation can result merely from energization of the motor in the proper direction. Spring clutch assembly or unit 2 (normally disengaged type) is usually used for dehydrating or partial drying operations and the load speed in this case would be in the neighborhood of 200 r.p.m., a typical duration of this portion of the complete cycle being 5 to 10 minutes.

High speed is attained through proper cyclic control of normally disengaged type spring clutch assembly or unit 2', essentially similar to clutch 2, for five to ten minutes at high speed which may be in the neighborhood of 500 r.p.m. In such case, assuming a conventional domestic electric motor, the belt and pulley relationships would be on the order of: Low speed reduction ratio 1:30; intermediate speed ratio 1:8, and high speed ratio 1:3. Assuming the laundering operations commence at low and continue through high speed and require several changes of speed, pronounced shock loads would normally occur at each change of speed, the greater shock load being between intermediate and high speeds. It is desirable for the mechanism to be able to "free wheel," as for load balancing purposes for example, in both intermediate and high speeds and in either case to have low parasitic drag. Further, it is desirable for time saving purposes to decelerate rapidly from intermediate or high speeds down to low speed and, as in case of emergency when driving at any speed and particularly intermediate and high speed, it is desirable to be able to stop all rotation as promptly as possible.

Control or actuation of the various spring clutches 2, 2' and 3 can be most easily effected, at least for automatic operation, by the use of electrical solenoids not shown which in such case would be connected to control members such as plungers partially shown at S², S²' and S³, FIG. 2 which selectively engage stops or abutments 15 on control sleeves or drums H, R and G respective to the spring clutches 2, 2' and 3. It is important to bear in mind in connection with the arrangement according to FIG. 2, that low speed clutch 3 as controlled by sleeve G effects clutch disengagement as between wheels A and B when the control sleeve G is arrested as by its actuator S³, but that the intermediate and high speed driving clutches 2 and 2' are engaged or rendered active only when the control sleeves or drums H and R are arrested as by their actuators S² and S²' respectively.

Referring to FIG. 2 low speed drive through clutch 1 in the forward direction or as indicated by the arrow at the left on FIG. 2 is obtained automatically as a function of energization of the motor RM. Overrunning expanding-to-grip type helical clutch spring P is in bridging relation to internal input drum surface portion of a drum member 11 carrying wheel A and a corresponding output drum surface portion of drum member 12 carrying or embodying wheel B. Helical spring P for the above indicated direction of operation is right hand wound, is heavily preloaded for anchorage on the drum member 11 and is lightly preloaded for energization on the internal surface of drum member 12.

For reverse low speed drive, helical spring O of clutch 3 is of the contracting-to-grip type, is in full floating preloaded relationship to external drum surface portions of input and output drum members 11 and 12, being right hand wound. For control of the spring O, one free end of the spring, shown in the form of a radial toe 13, is attached to the control sleeve G as by occupying a radial slot in the sleeve. For conservation of mass and for sound deadening the outer part of the sleeve G is preferably of tough plastic material 14 having one or more stop lugs or abutments 15 integral therewith and a metal insert sleeve or liner 16 which as shown would be prevented by the toe 13 from turning relative to the outer sleeve portion 14. When the actuator member S³ is projected into the broken line-illustrated position of it so as to be in the path of rotation of the lugs or abutments 15, the coils of the spring O at each side of the crossover region (gap 17) are expanded away from the associated drum surfaces through overrunning contact between other coils of the spring (left end) and the associated surface of input drum member 11.

Control sleeves H and R and control sleeve G" of FIG. 5 are very similar to control sleeve G as described above except that they have no slots for a spring toe such as 13, hence other suitable means are provided to prevent relative rotation between the metal liners and outer plastic parts. All of the abutments 15 of the three control sleeves face in the same direction or as shown in FIG. 3.

It may be noted at this point that drum member 11 carrying wheel A is connected for rotation with transmission supporting shaft L preferably through the intermediary of a flattened surface portion 20 of the shaft extending for its entire length between head members 7 and 8 of the shaft, which flattened surface is complementary to a non-circular opening partly indicated at 20' through the drum member 11. The input drum members 22 and 22' of clutches 2 and 2' are similarly secured to turn with the shaft L. All of the output drum members 12, 24 and 24' of the clutch units are journalled for free rotation about the axis of the shaft L as on durable metal spacer sleeves 19, 21 and 21' around the shaft and which are clamped tightly against the axially adjacent drum members 11, 22 and 22' when the head members 7 and 8 are secured to the shaft. The sleeves 19, 21 and 21' support respective bushings 25, 26 and 26' preferably pressed into the drum members 12, 24 and 24' respectively and turning freely on the supporting sleeves 19, 21 and 21'. Assuming one or both of the head members 7 and 8 are detachable from the shaft L (both so shown), it will be apparent that all of the various components of the clutch units can be slid into place over the shaft and held in proper axial position when the detachable head member is attached to the shaft as by a cross pin. Head member 7 is shown as threaded at 7a as one means for exerting axial clamping force preparatory to securing that head member as by its cross pin 7b.

As shown by comparison of FIGURES 2 and 3, each of the drum members 11, 24 and 24' has radial spoke portions 30 of equal length providing circumferentially spaced apart radially facing centering seats 31 and adjacent axial mounting faces 31' for disc portions 32 of each wheel which, when turned angularly with respect to the spoke portions 30, as diagrammatically shown in FIG. 3, can be moved past other wheel supports as necessary and then turned to align openings in the parts for reception of fasteners such as rivets 33. Thereby the mounting portions of each of the wheels can be identically stamped out, making it an inexpensive matter to change the driving ratios as may be desired or to adapt the construction to any number of drive ratio combinations or relationships.

Normally disengaged intermediate and high speed driving spring clutches 2 and 2' are preferably of identical construction and their counter-parts are given the same numbers but primed in the case of clutch 2'. These are torque limiting clutches as shown and claimed in a copending application Serial No. 777,140 filed November 28, 1958, owned by the assignee hereof, now Patent 2,934,325 issued May 16, 1961.

Clutch spring M of spring clutch 2 is coiled left hand or opposite the direction of coiling of clutch spring O. As most clearly shown in FIGURES 4 and 4a spring M is in bridging relation to drum surfaces 40 and 42 of the drum members 22 and 24 but normally out of engagement with drum surface 42. Preferably, as shown particularly by FIG. 4a, a group of anchor coils 41 are heavily preloaded on the input drum surface 40 and a group of coils 43 at each side of the crossover gap 46 are oversize in relation to coils 41 so as to be normally free from both clutch drum surfaces 40 and 42, which as shown are of equal diameters, but so as to be normally in light coil-centering and supporting contact with the interior cylindrical bore surface 47 of the metal insert or liner 48 of control sleeve or drum H. Additionally, at least two full control coils of the spring (group 45, FIG. 4a) are of sufficienty larger diameter in relation to the coils 43 so as to be preloaded in overrunning friction contact with the control drum surface 47 with appropriate interference fit, so that when the control sleeve H is stopped, as indicated in FIG. 4 by the position of actuator device $S^2$, the normal clearance 50 between the inner diameter surfaces of the group of coils 43 and the drum surfaces 40 and 42 will be eliminated through angular movement of the control sleeve H and drum member 22, and the coils 43 will be contracted onto the drum surfaces 40 and 42 with a predetermined energizing force such as to obtain the desired amount of limited torque capacity for the coils 43. This torque limiting principle is more fully discussed in the Tomko et al. application.

*Modified Construction, FIG. 5*

In FIG. 5, wherein clutch 3a is of the normally disengaged type and whose construction may be exactly as just above described in reference to FIGS. 4 and 4a, the overrunning clutch spring P serves for forward low speed drive exactly as it does in the case of FIG. 2, the control sleeve G″ and its control drum insert 16″ serve to control the energization of normally expanded coils of clutch spring O″ in reference to external drum surface 52 of drum member 11 and surface 54 of the drum member 12. Clutch spring O″ is right hand coiled. As compared to the intermediate speed normally disengaged spring clutch 2, the parts of the control sleeve G″ and the spring O″ are reversed left toward right.

In FIG. 5 the clutch spring O″ of clutch 3a is useful only for slow-down action and braking as will be described later. This clutch cannot be used for reverse drive as can normally engaged spring clutch 3 because there is no torque connection sufficient for energization of spring O″ between input drum 11 and the control sleeve G″.

Clutches 1 and 3 hereof (or 1 and 3a) use portions of common drum members (11 and 12) thereby effecting important saving in axial space. However, they could be side by side along the axis of shaft L and operate the same as in the constructions illustrated herewith. In that case the clutch springs would simply have separate input drum members connected with the drive shaft and cooperating drum surfaces on a freely journalled wheel corresponding to wheel B hereof, and spring P would preferably be of the contracting-to-grip type.

*Operation (FIG. 1 Thru FIG. 4a)*

For low forward speed or in the indicated direction all the control sleeves G, H, and R are released. Since the clutches 2 and 2′ are of the normally disengaged type, power is transmitted only from the wheel A through its expanding type overrunning helical spring P to the drum member 12 of pulley B and thence to the load as will be evident, and reverse-driving clutch spring O of clutch 3 and its associated control sleeve turn bodily with the drum members 11 and 12.

When the motor RM is reversed (actuator $S^3$ still out of the path of rotation of abutment 15) clutch spring O automatically contacts or grips its associated drum surfaces and drives the load at low speed. During reverse drive the actuators $S^2$ and $S^3$ are withdrawn from the paths of their associated abutments on control sleeves H and R.

When higher (intermediate) forward speed is desired control sleeve G is arrested as by its actuator $S^3$ causing the coils of spring O which have been seated on the external drum surface of drum member 12 to expand; and then the actuator $S^2$ is operated to arrest the control sleeve H whereby to contract the coils of spring M against its drums as shown in FIG. 4. During acceleration of the load from low speed to the intermediate speed the group of coils 50 (FIG. 4a) of clutch spring M slip at a predetermined value on output clutch drum surface 42 and relieve the shock which would otherwise have obtained.

Similarly, for high speed drive, control sleeve G is held; control sleeve H is preferably released, and control sleeve R of clutch 2′ is held in order to contract the clutch spring N onto its associated drum surfaces. Again, slip occurs during acceleration as in the case of the intermediate drive spring clutch 2. If during high speed drive the intermediate drive control sleeve H is not released, then the clutch spring M will have some but no important overrunning drag on the surface of drum member 24.

For free wheeling, which is useful in connection with balancing of load in the basket or tumbler RL and for other purposes, the control sleeves H and R are released depending upon whether each or both spring clutches 2 and 2′ have been engaged, whereupon the only overrunning drag in the system will be between the low speed driving self energizing expanding-to-grip clutch spring P and the drum member 12.

Assuming the load has been free wheeling at intermediate speeds, if a higher rate of deceleration than would obtain by coasting is desired, the control sleeve G of clutch 3 is released, allowing clutch spring O to reengage immediately after releasing the control sleeve H. Since during such intermediate speed drive the pulley B has been forced by its belt connection with the load to rotate faster than the transmission shaft L the released spring O now drives the transmission shaft L, hence the motor RM at greatly over normal speed so that the motor rotor inertia and the generator effect of the still energized motor brings the speed of the load promptly down to low.

In case emergency quick stopping is desired (e.g. becomes a function of electrical safety control of the various actuators $S^2$, $S^{2'}$ and $S^3$) the following braking operation can be safely and easily performed. Assuming the system has been operating at intermediate speed (with both control sleeves G and H held), the motor RM is first deenergized and immediately thereafter control sleeve G of clutch 1 is released (reenergizing spring O) while still holding the control sleeve H of clutch 2 to maintain energization of clutch spring M. Since the pulley B has been rotating faster than the speed of shaft L, the clutch spring O now tries to overdrive the shaft L through energy supplied by the load or tumbler basket RL hence also to overdrive the drum member 22 of clutch 2 attached to the shaft. Since spring M of clutch 2 is still energized, clutch 2 attempts to drive the wheel C faster than it is committed to be driven by its belt connection with the load, and braking is effected by slippage of the clutch spring M on the drum member 24 attached to the pulley C. The energy stored in the rotating load is thereby rapidly dissipated and the system comes to a stop. For emergency stopping when the drive has been through pulley D (high speed), clutches 2 and/or 3 are allowed to remain in engaged condition while the control sleeve G of clutch 3 is released and the motor RM is deenergized.

*Operation (per FIG. 5)*

In the system specifically according to FIG. 2, if the motor RM is energized for forward speed and the load RL is being operated at intermediate or high speed and then the clutch 2 or clutch 2′ whichever has been operating is disengaged, and clutch 3 should then be engaged braking would be effected through feed back from the load to the motor, but in such case there could be no shock absorption through clutch slippage. Clutch 3a of FIG. 5 would, if engaged under the same conditions, afford the same torque limiting action for shock absorption as do clutches 2 and 2′.

If, at any time when clutch units 2 and 2′ are released or disengaged and the load RL is free wheeling or coasting, an operator or bystander should open the door or cover of a cabinet (not shown) normally concealing the rotary load (e.g. tumbler basket), such person would be exposed to possible injury because the load, due to its high speed, would not appear to such person to be turning. The clutch arrangement according to FIG. 5, in such installation, would be connected to be engaged by stopping control sleeve G" thereof as a function of opening such cabinet door or cover either by operation of actuator S³" or a separate actuator (not shown but operatingly the same) whereupon, as the inertia of the load seeks to accelerate the transmission shaft L connected to the motor RM to much higher than its then existing speed, the speed of the load would be promptly and safely decelerated to low by the braking action of clutch spring O", FIG. 5, in case the motor RM is then energized or to zero speed if the motor was deenergized at the time when the cabinet door or cover was opened.

We claim:

1. In a self contained plural speed transmission unit, a drive shaft adapted for continuous connection to a rotary source of power, first, second and third spring clutches coaxial with the shaft, each clutch comprising an input clutch drum member, an output clutch drum member, and a helical friction spring bridging relatively adjacent drum surfaces of associated input and output drum members, the input drum members of the first and second clutches being connected to turn with the shaft, the output drum members of those clutches being journalled to turn independently of each other about the axis of the shaft, wheels on the output drum members of the first and second clutches adapted respectively for continuous connection with a common rotary load in low and high speed driving relationship, the third spring clutch being operatingly interposed between the low speed driving output drum member and the input drum member of the first spring clutch, and the clutch spring of the third spring clutch being coiled in such direction that the wheel of the low speed driving output drum member can overdrive or attempt to overdrive the shaft when the load is turning faster than at its low speed, respective actuator means connected to control selectively the helical springs of the second and third spring clutches to render their clutch springs active and inactive, one of the second and third spring clutches having means operating to limit its torque delivery capacity, whereby both the second and third spring clutches can be engaged simultaneously when the load is rotating faster than at low speed.

2. The transmission unit according to claim 1, wherein the third spring clutch is self energizing so as automatically to turn the load in a reverse direction as a function of reversal of the direction of operation of the power source.

3. The transmission unit according to claim 1, wherein the second spring clutch is normally disengaged, and the third spring clutch is normally engaged.

4. The transmission unit according to claim 1, wherein both the second and third spring clutches are normally disengaged.

5. The transmission unit according to claim 1, wherein coils of the helical spring of the second spring clutch are normally free from their associated output drum surface, and the actuator means for that clutch spring include a control drum member normally turned by the associated input clutch drum member and which is in overrunning frictional contact with coils of that spring, being preloaded thereon with limited radial force, so that stopping of the control drum member will deflect the normally free coils of the clutch spring of the second spring clutch into limited torque transmitting contact with their associated output drum surface, and means to stop rotation of the control drum member.

6. The transmission unit according to claim 1, wherein the clutch spring of the first clutch bridges internal drum surfaces of its associated input and output drum members and the clutch spring of the third clutch bridges external drum surfaces of those same two drum members.

7. A self contained plural speed power transmission unit, comprising a rotary input shaft adapted for connection with a rotary power source, first and second input clutch drum members connected to turn with the shaft about its axis, first and second output clutch drum members mounted to turn freely relative to the shaft about its axis and adapted to be constantly connected respectively to a common rotary load at low and high speed ratios, a first helical spring bridging the first input and output drum members and coiled to drive the associated output drum member for low speed operation of the load in one direction, a second helical spring bridging the second input and output drum members and coiled to drive the associated output drum member for high speed operation of the load in said direction, a third helical spring bridging the first input and output drum members and coiled to enable the first output drum member to transmit torque therethrough to the first input drum member in said direction during higher than low speed operation of the load, and actuator means operatingly connected respectively to the second and third helical springs to render them selectively active and inactive.

8. The transmission unit according to claim 7, wherein the actuator means for one of the second and third helical springs includes means operative to limit the energizing torque of the associated spring.

9. The transmission unit according to claim 7, wherein the second helical spring is normally free from its associated output drum and the third helical spring is free floating and preloaded on both its associated drum members.

10. The transmission unit according to claim 7, wherein the second helical spring is normally free from its associated output clutch drum member, and the third helical spring is preloaded on the first output clutch drum member and is normally free from its associated drum surface of the first input clutch drum member.

11. The transmission according to claim 7, wherein the shaft has head portions providing axial shoulders facing toward each other and is of uniform non-circular cross section between the shoulders, the input clutch drum members have openings mating the non-circular portion of the shaft, rigid metal sleeves around the shaft serve as spacers for the input drum members, and external peripheral surfaces of the sleeves support respective output drum members for free turning about the shaft axis, the sleeves being clamped against associated input drum members by the head portions.

12. The transmission unit according to claim 7, wherein two or more of the clutch drum members have integral similarly disposed equally spaced apart outwardly extending radial arms of equal length having peripheral seats and adjacent axial shoulders, and interchangeable annular wheel members having inwardly extending radial arms of equal length and equal circumferential spacing greater than the circumferential width of the arms of the clutch drum members are secured rigidly to the latter arms at their seats and shoulders.

13. A self contained plural speed power transmission unit, comprising a shaft adapted for continuous connection with a rotary power source, first and second clutch drum members respectively connected to turn with the shaft about its axis, two additional clutch drum members mounted to turn freely relative to the shaft about its axis and adapted to be constantly connected respectively to a common rotary load at low and high speed ratios, one way driving overrunning clutch means connecting the first clutch drive member to one of said additional clutch drum members for low speed operation of the load in one direction, a helical spring bridging the second clutch drum member and the other of said additional clutch drum members and coiled to drive the load at high speed therethrough in said direction, another helical spring bridging the first clutch drum member and said one of said additional clutch drum members and coiled to enable transmission of torque from the load to the shaft in said direction during higher than low speed operation of the load, and actuator means operatingly connected respectively to the two helical springs to render them selectively active and inactive.

14. The transmission unit according to claim 13, wherein the actuator means for one of the helical springs includes means operative to limit the energizing torque of the associated spring.

15. The transmission unit according to claim 13, wherein said other helical spring is self energizing on its associated clutch drum members for enabling reverse drive of the load at low speed.

16. A plural speed transmission mechanism, comprising a shaft connected to be driven in at least one direction at a normal speed by an electric motor, first and second input clutch drum members connected to turn with the shaft, first and second output clutch drum members adjacent to respective input drum members freely journaled for rotation relative to the shaft about its axis, means constantly connecting the first and second output drum members respectively to a common rotary load having considerable inertia at low and higher speed ratios, an overrunning one way driving clutch between the first input and output drum members to drive the load at low speed, a helical clutch spring bridging drum surfaces of the second input and output drum members and control means operable to render the spring active and inactive for driving the load at the higher speed and allowing the load to coast at such higher speed, another helical clutch spring bridging drum surfaces of the first input and output drum members and coiled in a direction to transmit torque therethrough from the coasting load to the shaft in a direction tending to drive the shaft and connected motor at higher than their normal speed, and control means operable to render said other helical spring active and inactive, so that with the first mentioned helical spring rendered inactive and the other helical spring rendered active the coasting load will be caused to decelerate more promptly than it otherwise would.

17. In a plural speed power transmission system, a rotary input shaft continuously connected with a reversible rotary power source, first and second input clutch drum members connected to turn with the shaft, first and second output clutch drum members mounted to turn freely about said axis relative to each other and to the shaft, said output drum members being constantly connected respectively to a common rotary load at low and high speed ratios, a self energizing, overrunning first helical clutch spring bridging the first input and output drum members and coiled to drive the first output drum member as a function of the shaft being driven in one direction for low speed operation of the load, a second helical clutch spring bridging the second input and output drum members and coiled to drive its output drum member in said direction for high speed operation of the load, a third helical spring bridging the first input and output drum members and coiled to enable the shaft to drive the first output drum member in a reverse direction at low speed as a function of reversal of the direction of operation of the power source, and actuator means capable of selectively rendering the second and third helical springs active and inactive.

18. The transmission system according to claim 17 wherein one actuator means includes means operative to limit the energizing torque of the helical spring controlled thereby.

References Cited in the file of this patent
UNITED STATES PATENTS

| | | |
|---|---|---|
| 2,660,899 | McCammon | Dec. 1, 1953 |
| 2,622,450 | Gorske et al. | Dec. 23, 1957 |
| 2,881,640 | Chambers | Apr. 14, 1959 |
| 2,885,896 | Hungerford et al. | May 12, 1959 |